United States Patent
Bert

(10) Patent No.: US 11,704,057 B2
(45) Date of Patent: Jul. 18, 2023

(54) MEMORY SUB-SYSTEMS INCLUDING MEMORY DEVICES OF VARIOUS LATENCIES AND CAPACITIES

(71) Applicant: Micron Technology, Inc., Boise, ID (US)

(72) Inventor: Luca Bert, Milpitas, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/933,755

(22) Filed: Jul. 20, 2020

(65) Prior Publication Data

US 2022/0019379 A1    Jan. 20, 2022

(51) Int. Cl.
*G06F 3/06* (2006.01)
*G06F 12/1009* (2016.01)

(52) U.S. Cl.
CPC .......... *G06F 3/0659* (2013.01); *G06F 3/0604* (2013.01); *G06F 3/0673* (2013.01); *G06F 12/1009* (2013.01); *G06F 2212/657* (2013.01)

(58) Field of Classification Search
CPC ........ G06F 3/0659; G06F 3/061; G06F 3/064; G06F 3/0685; G06F 3/0604; G06F 3/0673; G06F 12/1009; G06F 2212/657
See application file for complete search history.

(56) References Cited

U.S. PATENT DOCUMENTS

| 2008/0263259 A1* | 10/2008 | Sadovsky | G06F 3/0631 |
| | | | 711/100 |
| 2013/0262533 A1* | 10/2013 | Mitra | G06F 12/0862 |
| | | | 707/822 |
| 2013/0346537 A1* | 12/2013 | Fitzpatrick | H04L 67/1097 |
| | | | 709/213 |
| 2014/0325168 A1* | 10/2014 | Yun | G06F 3/061 |
| | | | 711/159 |

OTHER PUBLICATIONS

Edge, J., Stream IDs and I/O hints, 2016, https://lwn.net/Articles/685499/ (retrieved via Wayback Machine at https://web.archive.org/web/20170612034735/https://lwn.net/Articles/685499/), 2 pages (Year: 2016).*
Edge, J., A storage standards update, 2016, https://lwn.net/Articles/684264/ (retrieved via Wayback Machine at https://web.archive.org/web/20170612013309/https://lwn.net/Articles/684264/), 4 pages (Year: 2016).*

* cited by examiner

*Primary Examiner* — Gary W. Cygiel
(74) *Attorney, Agent, or Firm* — Lowenstein Sandler LLP

(57) ABSTRACT

A write request comprising a logical address, a payload, and an indicator reflecting the character of the payload is received from an application. Based on the indicator, a value of a parameter associated with storing the payload on one or more of a plurality of memory devices is identified. The value of the parameter is determined to satisfy a criterion associated with a particular memory device of the plurality of memory devices. The payload is stored on the particular memory device.

20 Claims, 4 Drawing Sheets

300

Receive a write command comprising a logical address, a payload, and an indicator reflecting a characteristic of the payload
310

Identify, based on the indicator, a value of a parameter associated with storing the payload on one or more of the plurality of memory devices
320

Determine that the value of the parameter satisfies a criterion associated with a particular memory device of the plurality of memory devices
330

Store the payload on the particular memory device
340

Update a data allocation table to associate the logical address with a physical address reflecting a location of the payload on the particular memory device
350

MEMORY SUB-SYSTEMS INCLUDING MEMORY DEVICES OF VARIOUS LATENCIES AND CAPACITIES

TECHNICAL FIELD

Embodiments of the disclosure relate generally to memory sub-systems, and more specifically, relate to memory sub-systems including memory devices of various latencies and capacities.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 3 is a flow diagram of an example method to execute a tagged write command on the appropriate memory device, in accordance with some embodiments of the present disclosure.

DETAILED DESCRIPTION

Figure 1:
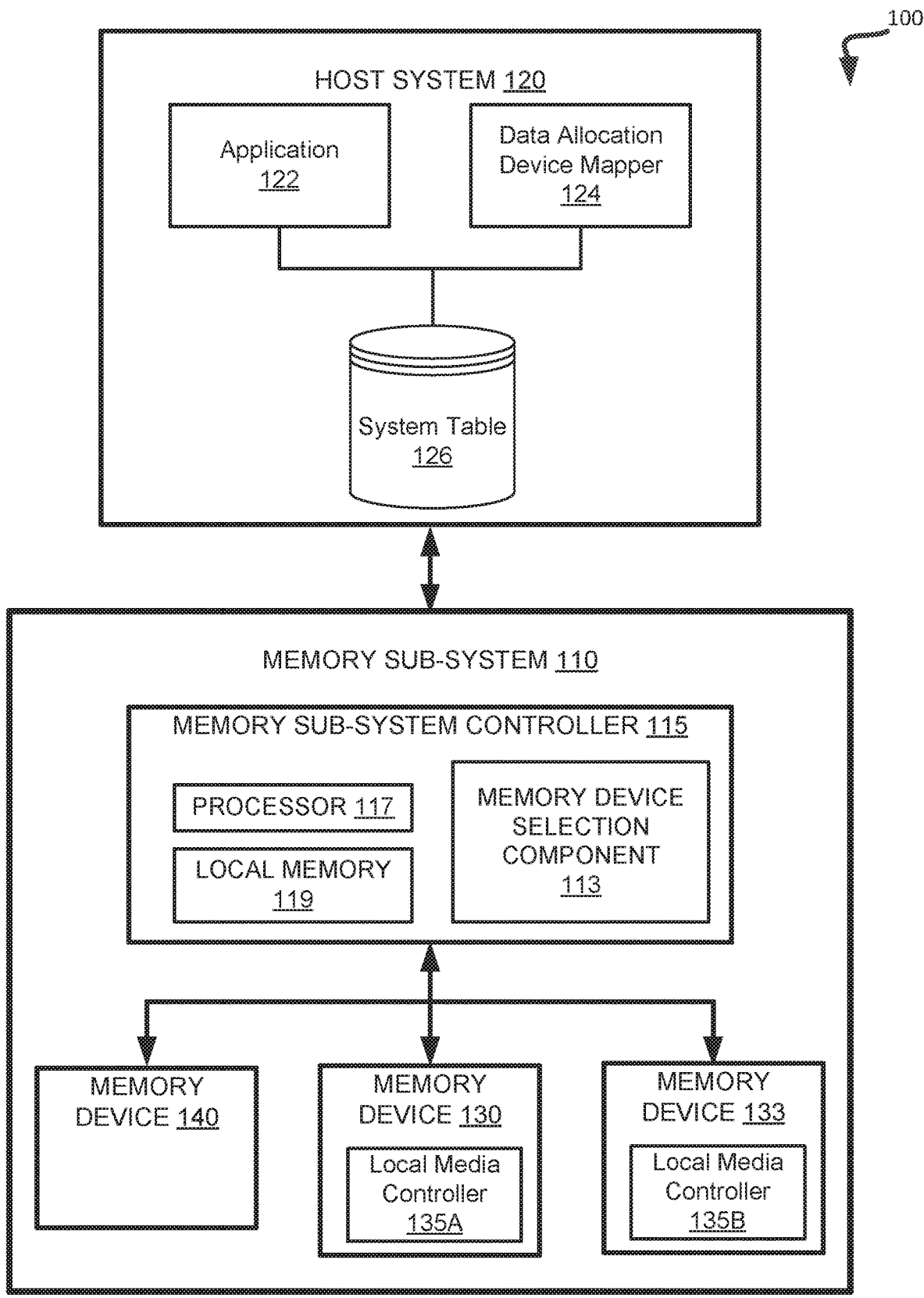
FIG. 1 illustrates an example computing system that includes a host system and a memory sub-system in accordance with some embodiments of the present disclosure.

Aspects of the present disclosure are directed to memory sub-systems including memory devices of various latencies and capacities. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include multiple memory devices to store data from a host system. One example of a non-volatile memory device is a negative-and (NAND) memory device. Another example of a non-volatile memory device is a three-dimensional cross-point ("3D cross-point") device that is a cross-point array of non-volatile memory that can perform bit storage based on a change of bulk resistance, in conjunction with a stackable cross-gridded data access array. Other examples of non-volatile memory devices are described below in conjunction with FIG. 1. The memory sub-system includes a memory sub-system controller that can communicate with the memory devices to perform operations such as reading data, writing data, or erasing data at the memory devices and other such operations. A memory sub-system controller is described in greater below in conjunction with FIG. 1.

The host system can send access requests (e.g., write commands, read commands) to the memory sub-system, such as to store data on a memory device of the memory sub-system and to read data from the memory device of the memory sub-system. A write request can include a payload, which includes the data to be written. The payload can have certain characteristics, such as whether the data to be written represents metadata or data in a file system, or a key or value in a key-value store, for example.

A solid state drive is an example of a memory sub-system, and can include multiple memory devices having various storage media types, such as NAND and/or 3D cross-point. Memory devices can be evaluated based on certain attributes, such as capacity and performance. Capacity can refer to how much data can be stored on the memory device. Performance can refer to latency, or the time it takes to access a particular location on the memory device. As an example, high latency of memory devices can be measured in tens of microseconds, while low latency can be measured in tens of nanoseconds. Conventional NAND memory devices are relatively inexpensive and hence can be used to store large amounts of data (i.e., have a high capacity), but they are typically slow and fail many performance needs (i.e., have high latency). Newer storage class memory (SCM) technologies, such as 3D cross-point, are extremely fast and thus have low latency, but they are relatively expensive and often cannot economically be used to meet the growing required capacities of memory sub-systems. Thus, it can be advantageous to have a single memory sub-system (e.g., an SSD) that includes both high capacity memory devices (e.g., NAND memory devices) and low latency memory devices (e.g., SCM memory devices) in order to take advantage of both fast (but expensive) storage technology and large (but slow) storage technology.

However, conventional SSD including memory devices having various capacities and latencies, such as high capacity memory devices (e.g., memory devices having their respective capacities exceeding a certain threshold capacity) and low latency memory devices (e.g., memory devices having their respective latencies below a certain threshold latency) (referred to as hybrid SSD) lack an efficient way to determine on which memory device to store data. For example, conventional hybrid SSD may store large data writes on a high capacity memory device, and store relatively smaller data writes on a low latency memory device. However, the size of the payload alone may not properly reflect the characteristics of the data being written. Characteristics of the data can include whether the data being written represents metadata or data, or whether the data being written is expected to be updated relatively frequently, for example. As a result, assigning the type of memory device based on the size of the payload may lead to inefficient use of the hybrid SSD. For example, without regard to the characteristics of a payload, a conventional hybrid SSD might store a larger metadata payload on a traditionally slow memory device. This would cause excessive latency because the metadata can be frequently updated. Furthermore, in order to keep the metadata consistent, other I/O operations of an application are paused while metadata is being synchronized, creating even more latency if the metadata is stored on a high latency memory device, such as a NAND memory device. Conversely, storing long-term data from an application on a low latency memory device (e.g., 3D cross-point), even if the size of the data being stored long-term is relatively small as compared to the memory device capacity, is an inefficient use of the memory device, since the low latency memory device would be used more efficiently used for storing metadata that may be updated more frequently as compared to other types of data.

Aspects of the present disclosure address the above and other deficiencies by having a memory sub-system that efficiently combines high capacity memory devices and low latency memory devices in the same memory sub-system (e.g., SSD). The memory sub-system can have a single namespace (e.g., a filesystem, a key-value storage, or an object storage) whose capacity is the sum of the capacities of the high capacity memory device and the low latency memory device, and as such neither the high capacity memory device nor the low latency memory device is separately exposed to the host system.

The host system can include a software framework designed to intercept the write requests and to determine certain characteristics of the write requests. In some implementations, the software framework can be, for example, implemented as a device mapper operating at the Linux kernel level (e.g., as a part of a driver stack), for mapping physical block devices onto higher-level virtual block devices. The device mapper can pass information from the virtual block devices to the memory sub-system. The device mapper can intercept write requests in the host system and can attach an attribute to the write command describing certain characteristics of the data is to be written (e.g., the expected frequency of updates of the data, which can depend on whether the data represents metadata or application data in a filesystem, or a key or a value in a key-value store). For example, the device mapper can set a tag to instruct the memory sub-system on which memory device (e.g., a high capacity memory device such as NAND, or a low latency memory device such as SCM) to execute the write command. In some implementations, the software framework can be implemented at the user space level.

Advantages of the present disclosure include, but are not limited to, more efficient use of hybrid solid state device. The system and method described herein provide for precise data allocation, based on the nature of the data being stored in hybrid memory sub-systems, which can be used across multiple application types. Aspects of the present disclosure will result in memory devices that perform better and last longer.

FIG. 1 illustrates an example computing system 100 that includes a host system 120 and a memory sub-system 110 in accordance with some embodiments of the present disclosure. The memory sub-system 110 can include media, such as one or more volatile memory devices (e.g., memory device 140), one or more non-volatile memory devices (e.g., memory device 130, 133), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secured digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The host system 120 can include an application 122, a data allocation device mapper 124, and a system table 126. The application 122 on host system 120 can send access requests (e.g., write commands, read commands) to the memory sub-system 110, such as to store data on a memory device 130, 133 of the memory sub-system 110, and to read data from the memory device 130, 133 of the memory sub-system 110. A write request can include a payload, which includes the data to be written.

In an illustrative example, the host system 120 can use a filesystem as a means to organize the data on the memory device 130, 133 of the memory sub-system by providing procedures to store, retrieve and update the data, as well as manage the available space on the memory device 130, 133. A filesystem organizes data in an efficient manner and can be tuned to the specific characteristics of the memory device. Filesystems are used on various memory devices to maintain the physical locations of computer files. Filesystems generally allocate memory space in a granular manner, usually using multiple physical units on the memory device. Filesystems are responsible for organizing files and directories, and keeping track of which areas of the device belong to certain files and which are not being used. Filesystems contain data blocks storing the actual data from an application or operating system running on the host system, as well as metadata blocks. The filesystem metadata contains information about the design, structure and layout of the data structures used to store the actual data. Filesystems store the metadata associated with the file separate from the contents of the file (i.e., the actual data).

Alternatively, object storage can be used in place of a filesystem. For example, in certain large scale computing implementations, objects can be used in place of a file when the features of those objects are more suitable (e.g., the presence of comprehensive metadata stored with the file eliminating the tiered file structure associated with filesystems).

As another example, a key value store can be used as a means to organize the data on the memory device 130, 133 of the memory sub-system 110 by providing procedures to store, retrieve, and update the data, as well as manage the available space on the memory device 130, 133. Key value stores accept a key value pair (i.e., including a key and a value) and are configured to respond to queries pertaining to the key. Key value stores can include such structures as dictionaries in which the key is stored in a list that links (or contains) the respective value.

The application 122 can be organized as a file system, a key value store, or another type of application. The system table 126 can store descriptors of the data stored by the application. For example, in a file system, the system table 126 stores information about each file, including the metadata and data.

The application 122 can send a write request that includes a payload. The data allocation device mapper 124 can intercept the write request. The data allocation device mapper 124 can identify characteristics about the payload using the system table 126. For example, the data allocation device mapper 124 can determine whether the payload is data or metadata in a filesystem. As another example, the data allocation device mapper 124 can determine whether the payload is a key or a value in a key value store.

Having determined the characteristics of the payload, the data allocation device mapper 124 can attach an attribute describing the characteristics of the payload to the write request. In one implementation, a tag, which reflects the characteristic of the payload, is associated with the write request. For example, as described below, the tag can be the StreamID in a Linux driver stack.

The memory devices 130, 133, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory devices 130, 133) includes a negative-and (NAND) type flash memory and write-in-place memory, such as three-dimensional cross-point ("3D cross-point") memory. In some implementations, memory devices 130 can be a NAND memory device and memory devices 133 can be a 3D cross-point memory device. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 133 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130, 133 can include one or more arrays of memory cells such as SLCs, MLCs, TLCs, QLCs, or any combination of such. In some embodiments, memory devices 130 can include one or more arrays of SLC cells, while memory devices 133 can include one or more arrays of MLC, TLC, and/or QLC cells. In some embodiments, a particular memory device can include an SLC portion, and an MLC portion, a TLC portion, or a QLC portion of memory cells. The memory cells of the memory devices 130, 133 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130, 133 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130, 133 to perform operations such as reading data, writing data, or erasing data at the memory devices 130, 133 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc.

The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130, 133. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130, 133. The memory sub-system controller 115 can further include host interface circuitry to communicate with the host system 120 via the physical host interface. The host interface circuitry can convert the commands received from the host system into command instructions to access the memory devices 130, 133 as well as convert responses associated with the memory devices 130, 133 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130, 133.

In some embodiments, the memory devices 130, 133 include local media controllers 135A, 135B that operate in conjunction with memory sub-system controller 115 to execute operations on one or more memory cells of the memory devices 130, 133 (respectively). An external controller (e.g., memory sub-system controller 115) can externally manage the memory device 130, 133 (e.g., perform media management operations on the memory device 130, 133). In some embodiments, a memory device 130, 133 is a managed memory device, which is a raw memory device combined with a local controller (e.g., local controller 135A, 135B) for media management within the same memory device package. An example of a managed memory device is a managed NAND (MNAND) device.

The memory sub-system 110 includes a memory device selection component 113 that can determine on which memory device to store the payload included in a write request. In some embodiments, the memory sub-system controller 115 includes at least a portion of the memory device selection component 113. In some embodiments, the memory device selection component 113 is part of the host system 120, an application 122, or an operating system.

The memory device selection component 113 can receive a write command from the host system 120. The write command can include a logical address, a payload, and an indicator reflecting one or more characteristics of the payload. The characteristics can represent, for example, a functional designation of the data in the payload, an expected frequency of updates of the data in the payload, or both. As described above, the application sending the write request can be organized as a filesystem, in which case, the indicator in the write command can indicate whether the data in the payload is data or metadata. Metadata is data that describes other data, e.g., the file system metadata associates a file name with one or more memory device locations in which the content of the file is stored. In another example, the application sending the write request can be organized as a key value store, in which case, the indicator in the write command can indicate whether the data in the payload is a key or a value.

Memory devices 130, 133 can be included in one memory sub-system, exposed as a single namespace. The namespace is a quantity of one or more memory devices 130-133 that can be formatted into logical blocks (e.g., ranges of LBA space), when memory devices are configured with an NVMe protocol. The NVMe protocol provides access to the namespace, which appears as a standard-block device on which filesystems and applications can be deployed without any modification. By exposing one single namespace as a combination, rather than having two namespaces (e.g., one for the high capacity memory devices, such as memory device 130, and one for the low latency memory devices, such as memory device 133) addresses the concern of capacity limitations. If the capacity required in one class exceeds the medium in that capacity, the memory sub-system 110 can use the other medium, knowing the system cannot exceed the total capacity. That is, if the low latency memory device 133 is full and the memory sub-system receives a write command for metadata, the memory sub-system can decide to store the metadata on the high capacity memory device 130. A single namespace avoids requiring a mapping table to be persisted.

Based on the indicator, the memory device selection component 113 can identify a memory device type of a memory device 130, 133 for storing the payload. For example, if the indicator indicates that the data in the payload represents metadata in a file system, the memory device selection component 113 can identify a low latency memory device, such as memory device 133, on which to store the payload. Memory device 133 can have a latency value that the memory device selection component 113 can use to identify the memory device as a low latency device. For example, in order to identify memory device 133 as a low latency memory device, the memory device selection component 113 can compare the latency value of memory device 133 to a threshold latency value. Examples of a low latency memory device include SCM (e.g., 3D cross-point) or memory devices configured as SLC. For example, a memory device configured as SLC can have a lower read latency (e.g., how long it takes for data stored at SCL to be read), and a faster programming time (e.g., how long it takes to program data received from the host system to the cell for storage). However, since each SLC only stores a single bit of data, a memory device configured as SLC will have a lower storage capacity when compared to a memory device configured as QLC or TLC, for example.

If the indicator indicates that the data in the payload represents data in a file system, the memory device selection component 113 can identify a high capacity memory device, such as memory device 130, on which to store the payload. Memory device 130 can have a capacity value that the memory device selection component 113 can use to identify the memory device as a high capacity device. For example, in order to identify memory device 130 as a high capacity memory device, the memory device selection component 113 can compare the capacity value of memory device 133 to a threshold capacity value. Examples of a high capacity memory device can include NAND memory devices configured as TLC or QLC. For example, a memory device configured as QLC stores four bits of data per memory cell, and hence has a higher storage capacity when compared to a memory device configured as SLC. However, a memory device configured as QLC can have a higher read latency and a slower programming time. Similarly, if the indicator indicates that the data in the payload represents a key in a key value store (KVS), the memory device selection component 113 can identify a low latency memory device 133 on which to store the payload. If the indicator indicates that the data in the payload represents a value in a KVS, the memory device selection component 113 can identify a high capacity memory device 130 on which to store the payload.

In one implementation, the indicator can indicate that the data in the payload is expected to be updated frequently (e.g., at least once within a specified period of time), in which case the memory device selection component 113 can identify a low latency memory device on which to store the payload, such as memory device 133. Alternatively, if the indicator indicates that the data in the payload is expected not to be updated frequently, the memory device selection component 113 can identify a high capacity memory device on which to store the payload, such as memory device 130.

Once the memory device selection component 113 has identified a type of memory device on which to store the payload, the memory device selection component 113 can identify the actual memory device 130, 133 on which to store the payload, and can store the payload on the identified device. The memory device selection component 113 can then update the data allocation table (not shown) to associate the logical address with a physical address reflecting the location of the payload on the memory device.

Figure 2:
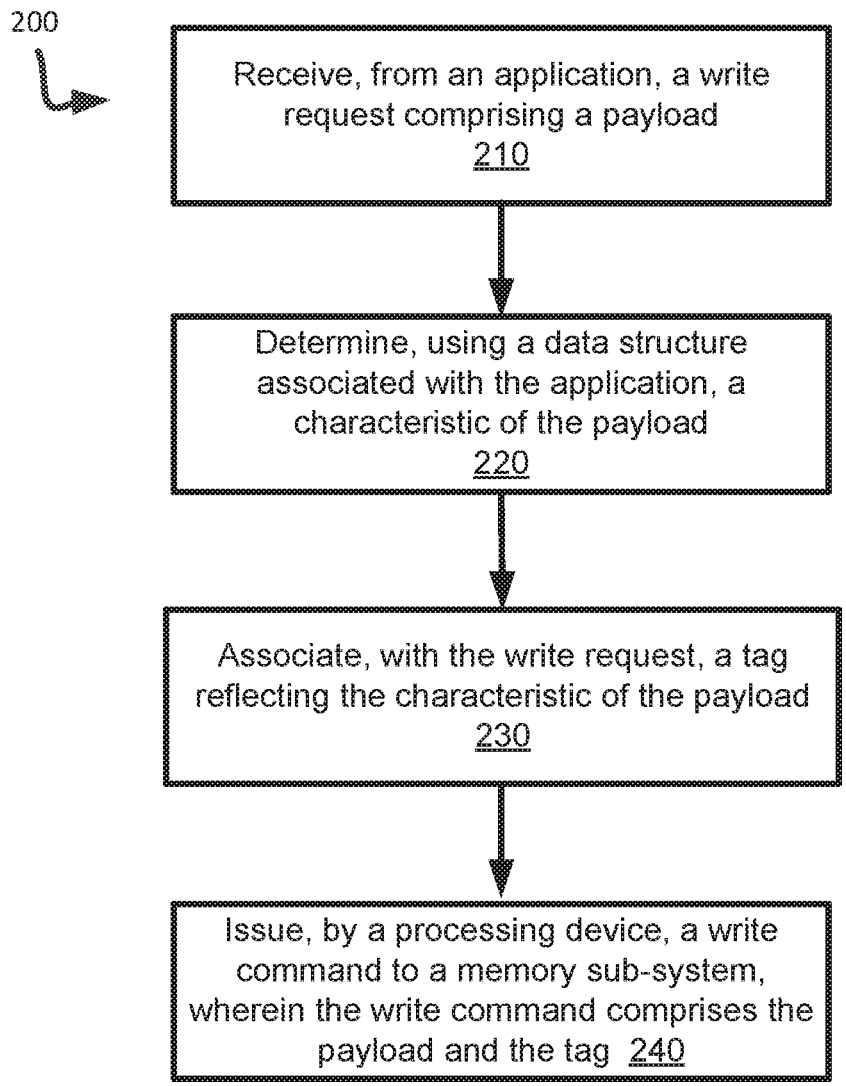
FIG. 2 is a flow diagram of an example method to tag a write request to indicate on which memory device to execute the write request, in accordance with some embodiments of the present disclosure.

FIG. 2 is a flow diagram of an example method 200, implemented by the host system, to tag a write request to indicate on which memory device to execute the write request, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the data allocation device mapper 124 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, the processing device receives, from an application, a write request comprising a payload. In some implementations, the host system can use a filesystem, or a key-value store, for example, to organize the data from the application. In a filesystem, for example, write requests from the host can be either for data or metadata. A write request from the host for data can contain actual data from an application or operating system running on the host system, whereas a write request for metadata can contain information about the design, structure, and layout of the data structures used to store the actual data. Data write requests tend to be larger in size than metadata, and are expected to experience a lower typical frequency of updates, as compared to the typical frequency of updates of metadata. Metadata write requests tend to be smaller than data writes, and can expect to be updated more frequently. Furthermore, since metadata is kept consistent, all other I/O operations can be paused while metadata is being written. As such, the metadata write request are expected to be executed with low latency (e.g., with latency falling below a certain latency threshold). The filesystem can maintain a system table that characterizes data as metadata or data within the filesystem.

In other implementations, the host can use a key value store (KVS) instead of a filesystem. In KVS systems, a key is a unique identifier for a data item; the data item is referred to as a value. The key value store can maintain a system table to identify whether data are keys or values. KVS keys can be expected to be updated more frequently, and tend to be smaller in size than a value. Conversely, KVS values are expected to experience a lower typical frequency of updates, as compared to the typical frequency of updates of keys, and tend to be larger in size than keys.

At operation 220, the processing device determines, using a data structure associated with the application, a characteristic of the payload. The data structure associated with the application can be system tables that describe the payload. For example, the filesystem system tables can describe whether the payload is for data or metadata. As another example, the KVS system table can describe whether the payload is for a key or for a value. The data structure associated with the application is not limited to these examples. The processing device can search the system tables to identify the descriptors associated with the data specified in the write request.

At operation 230, the processing device associates, with the write request, an indicator reflecting one or more characteristics of the payload. The characteristic of the payload can represent a functional designation of the data in the payload, such as whether the data in the payload represents metadata or data, or a key or a value. The characteristic of the payload can, alternatively or additionally, represent an expected frequency of updates of data in the payload. For example, the indicator can indicate whether the data in the payload is expected to be updated frequently (such as metadata might be), e.g. at least once within a specified period of time, or whether the data is expected to be stored long-term with fewer expected updates (such as data might be). For example, data that is frequently updated can be updated once every second, while data that is updated less frequently can be updated once every 30 seconds.

In some embodiments, the indicator associated with the write request can be a tag that is part of a driver stack. The processing device can set the value of a field in the driver stack. For example, Linux driver stacks have a streamID field that the processing device can use as a tag to indicate the characteristic of the payload. Linux drivers are programmed to reserve and preserve the StreamID field. That is, once set, the StreamID tag will not be disturbed as the command is passed through the block level and NVMe driver, for example. Hence in some implementations, the processing device, through the device mapper, can set the StreamID tag to specify the type of data in the write command, and can then forward the write command, along with the StreamID, to the memory sub-system. In the filesystem example, setting the streamID to zero can indicate that the payload is for data, and setting the streamID to one can indicate that the payload is for metadata. In the KVS example, setting the streamID to zero can indicate that the payload is for a value, and setting the streamID to one can indicate that the payload is for a key. There may be other ways to associate a tag with the write request to reflect the characteristic of the payload.

At operation 240, the processing device issues a write command to a memory sub-system. The write command can include the payload and the newly assigned attribute (e.g., the tag).

FIG. 3 is a flow diagram of an example method 300, implemented by the memory sub-system controller, to execute a tagged write command on the appropriate memory device, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the memory device selection component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing device receives, from a host system, a write command specifying a logical address, a payload, and an indicator reflecting one or more characteristics of the payload. The characteristics of the payload can represent a functional designation of the data in the payload, such as whether the data in the payload represents metadata or data in a filesystem, or a key or a value of a key-value pair. The characteristics of the payload can, alternatively or additionally, represent an expected frequency of updates of data in the payload.

At operation 320, the processing device identifies, based on the indicator, a value of a parameter associated with storing the payload on one or more of the plurality of memory devices. Using the indicator associated with the write command, the processing device can identify a capacity parameter value and/or a latency parameter value, for example. Based on the indicator indicating that the payload represents metadata (or a key of a key-value pair, or that it expects to be frequently updated), the processing device can determine that the payload be stored on a low latency memory device, such as SCM or a memory device configured as SLC. In this case, the processing device can identify a latency parameter value associated with storing the payload. Based on the indicator indicating that the payload represents data (or a value of a key-value pair, or that it expects to be stored long term), the processing device can determine that the payload be stored on a high capacity memory device, such as NAND memory devices configured as QLC or TLC. In this case, the processing device can identify a capacity parameter value associated with storing the payload. For example, the particular parameter value can specify a first number of bits per cell (e.g., an SLC), or a second number of bits per cell (e.g., a NAND memory device configured as QLC or TLC).

At operation 330, the processing device determines that the value of the parameter satisfies a criterion associated with a particular memory device of the plurality of memory devices. The processing device can identify a memory device that has a capacity that exceeds or is equal to a capacity threshold, or the processing device can identify a memory device that has a latency that does not exceed a latency threshold. In some implementations, the processing device can access the data allocation table to determine which memory devices have sufficient space on which to store the payload. The processing device can identify a low latency memory device on which to store payloads with certain characteristics (e.g., that the payload represents metadata in a filesystem, a key in KVS, or that the payload is expected to be updated frequently). The processing device can identify a high capacity memory device on which to store payloads with other characteristics (e.g., that the payload represents data in a filesystem, a value in KVS, or that the payload is not expected to be updated frequently).

At operation 340, the processing device stores the payload on the particular memory device. At operation 350, the processing device updates a data allocation table to associate the logical address with a physical address reflecting the location of the payload on the particular memory device.

Figure 4:
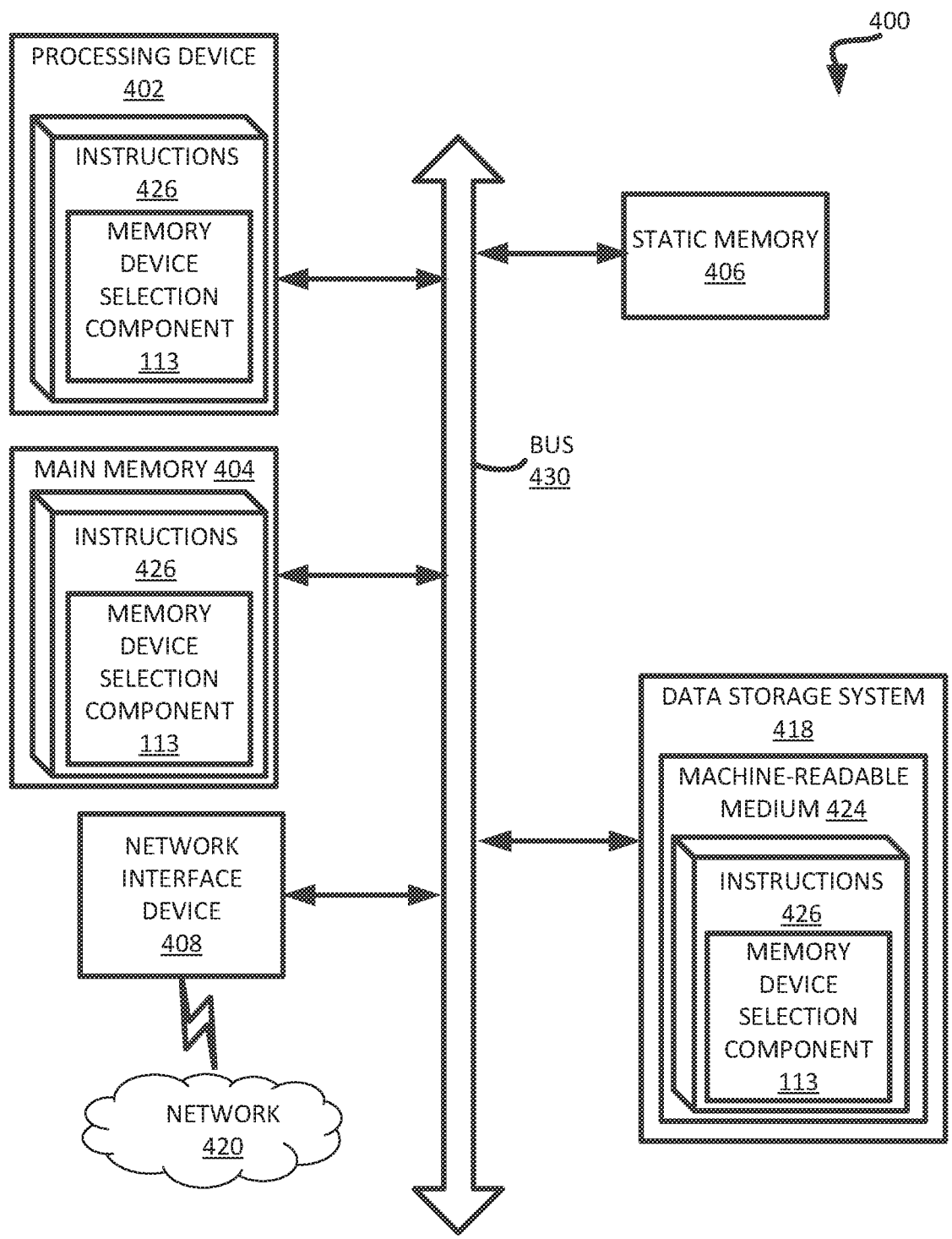
FIG. 4 is a block diagram of an example computer system in which embodiments of the present disclosure may operate.

FIG. 4 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the memory device selection component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or RDRAM, etc.), a static memory 406 (e.g., flash memory, static random access memory (SRAM), etc.), and a data storage system 418, which communicate with each other via a bus 430.

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory sub-system 110 of FIG. 1.

In one embodiment, the instructions 426 include instructions to implement functionality corresponding to a memory device selection component (e.g., the memory device selection component 113 of FIG. 1). While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a plurality of memory devices; and
a processing device, operatively coupled with the plurality of memory devices, to perform operations comprising:
receiving a write command comprising a logical address, a payload, and an indicator reflecting a functional characteristic of the payload, wherein the functional characteristic is selected from a group consisting of a key and a value associated with a key-value store;
identifying, based on the indicator, a value of a parameter associated with storing the payload on one or more of the plurality of memory devices;
determining that the value of the parameter satisfies a criterion associated with a particular memory device of the plurality of memory devices; and
storing the payload on the particular memory device.

2. The system of claim 1, wherein determining that the value of the parameter satisfies the criterion further comprises:
determining that the value of the parameter exceeds or is equal to a capacity threshold.

3. The system of claim 1, wherein determining that the value of the parameter satisfies the criterion further comprises:
determining that the value of the parameter does not exceed a latency threshold.

4. The system of claim 1, wherein the plurality of memory devices comprises at least one first memory device having a latency not exceeding a latency threshold and at least one second memory device having a capacity exceeding or equal to a capacity threshold.

5. The system of claim 1, wherein the plurality of memory devices are exposed to a host computing system within a single namespace.

6. The system of claim 1, wherein the functional characteristic represents one of: a functional designation of data comprised by the payload or an expected frequency of updates of data comprised by the payload.

7. The system of claim 1, wherein the functional characteristic represents a functional designation of data comprised by the payload, and wherein the value of the parameter specifies a number of bits per cell of the particular memory device.

8. The system of claim 1, wherein the processing device is to perform operations further comprising:
updating a data allocation table to associate the logical address with a physical address reflecting a location of the payload on the particular memory device.

9. A method comprising:
intercepting, from an application, by device mapping logic operating at a kernel level, a write request comprising a payload;
identifying, in a data structure associated with the application, a functional characteristic of the payload, wherein the functional characteristic is selected from a group consisting of a key and a value associated with a key value store;
associating, with the write request, an indicator reflecting the functional characteristic of the payload; and
issuing, by a processing device, a write command to a memory sub-system, wherein the write command comprises the payload and the indicator.

10. The method of claim 9, wherein the functional characteristic represents one of: a functional designation of data comprised by the payload or an expected frequency of updates of data comprised by the payload.

11. The method of claim 9, wherein the indicator reflecting the functional characteristic of the payload is set by a kernel level process.

12. The method of claim 9, wherein the application uses one of: a file system or the key value store.

13. The method of claim 9, wherein the data structure associated with the application comprises a data structure associating each payload with one or more characteristics of the payload.

14. A non-transitory computer-readable storage medium comprising instructions that, when executed by a processing device, cause the processing device to perform operations comprising:
receiving a write command comprising a logical address, a payload, and an indicator reflecting a functional characteristic of the payload, wherein the functional characteristic is selected from a group consisting of a key and a value associated with a key-value store;
identifying, based on the indicator, a value of a parameter associated with storing the payload on one or more of a plurality of memory devices;
determining that the value of the parameter satisfies a criterion associated with a particular memory device of the plurality of memory devices; and
storing the payload on the particular memory device.

15. The non-transitory computer-readable storage medium of claim 14, wherein determining that the value of the parameter satisfies the criterion further comprises:
determining that the value of the parameter exceeds or is equal to a capacity threshold.

16. The non-transitory computer-readable storage medium of claim 14, wherein determining that the value of the parameter satisfies the criterion further comprises
determining that the value of the parameter does not exceed a latency threshold.

17. The non-transitory computer-readable storage medium of claim 14, wherein the plurality of memory devices comprises at least one first memory device having a latency not exceeding a latency threshold and at least one second memory device having a capacity exceeding or equal to a capacity threshold.

18. The non-transitory computer-readable storage medium of claim 14, wherein the plurality of memory devices are exposed to a host computing system within a single namespace.

19. The non-transitory computer-readable storage medium of claim 14, wherein the functional characteristic represents one of: a functional designation of data comprised by the payload or an expected frequency of updates of data comprised by the payload.

20. The non-transitory computer-readable storage medium of claim 14, wherein the functional characteristic represents a functional designation of data comprised by the payload, and wherein the value of the parameter specifies a number of bits per cell of the particular memory device.

\* \* \* \* \*